United States Patent
Lawson et al.

(10) Patent No.: US 6,659,290 B1
(45) Date of Patent: Dec. 9, 2003

(54) OIL WATER SEPARATOR WITH AIR SPARGING ARRAY FOR IN-SITU CLEANING

(75) Inventors: John J. Lawson, Severn, MD (US); Steven A. Stetz, Stevensville, MD (US); Stephan J. Verosto, Columbia, MD (US); Nete M. Poret, Jessup, MD (US); Richard R. Leung, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 128 days.

(21) Appl. No.: 09/826,768

(22) Filed: Apr. 5, 2001

(51) Int. Cl.[7] .......................... C02F 1/40; B01D 21/00; B01D 21/02

(52) U.S. Cl. .................. 210/521; 210/522; 210/802

(58) Field of Search ................... 210/521, 522, 210/221.2, 802

(56) References Cited

U.S. PATENT DOCUMENTS

| | | | |
|---|---|---|---|
| 2,366,184 A | | 1/1945 | Dean |
| 3,155,459 A | | 11/1964 | Brown et al. |
| 3,479,281 A | * | 11/1969 | Kikindai |
| 4,151,075 A | * | 4/1979 | Othmer |
| 4,897,206 A | * | 1/1990 | Castelli |
| 4,933,524 A | * | 6/1990 | Meurer |
| 5,536,409 A | * | 7/1996 | Dunkers |
| 6,149,827 A | * | 11/2000 | Nielson |

FOREIGN PATENT DOCUMENTS

JP 63-001408 * 1/1988

* cited by examiner

*Primary Examiner*—Thomas M. Lithgow
(74) *Attorney, Agent, or Firm*—Jacob Shuster

(57) ABSTRACT

In-situ cleaning of the bilgewater processing plates of stacks within the tank chamber of an oil/water separator is performed by an injected chemical cleaning agent while being dispersed by diverted flow of pressurized air introduced into the tank chamber below the plate stacks in the form of air bubbles emerging from plural branches of an air sparging array positioned in underlying alignment with crest formations of the processing plates.

9 Claims, 4 Drawing Sheets

OIL WATER SEPARATOR WITH AIR SPARGING ARRAY FOR IN-SITU CLEANING

The present invention relates in general to oil water separators which periodically require cleaning.

BACKGROUND OF THE INVENTION

Oil-water separators are presently installed in marine vessels, such as ships of the U.S. Navy, for treatment of oily wastewater. Oil removed by such treatment is retained on board within a waste oil tank while the cleansed water is discharged overboard through a drain line from the separator tank. Treatment of the oily wastewater currently involves its gravitational flow through parallel stacked plates of a plastic type material within the separator tank, onto which oil sludges are thereby deposited. Such stacked plates therefore require periodic cleansing for removal of the sludges in order to maintain separator functioning at its optimal level. In view of the laborious nature of current cleansing procedures utilized, disposal of hazardous waste is costly. It is therefore an important object of the present invention to provide for less costly and more efficient in-situ cleansing of the foregoing type of oil-water separators.

SUMMARY OF THE INVENTION

In accordance with the present invention, enhanced in-situ cleansing of contaminated stacked plates of an oil-water separator is performed by injection of a commercially available chemical agent into the tank chamber of the separator, with the cleaning action of the chemical agent enhanced by an air sparging array operationally positioned in underlying relation to the plate stacks. Operation of the air sparging array is arranged to achieve optimized dispersion of the chemical cleaning agent during gravitationally induced downflow for more effective sloughing of the oily sludge accumulated on the stacked plates as a result of the oil separation treatment performed. The air sparging array is accordingly configured to provide for emergence therefrom, at appropriately spaced locations underlying the plate stacks, air bubbles of varying size for most efficiently imparting turbulence to the chemical cleansing agent and/or inject oxygen from the air where the cleansing agent includes an active aerobic microbe. Such air bubbles are derived from pressurized air supplied to the array from a ship service source.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
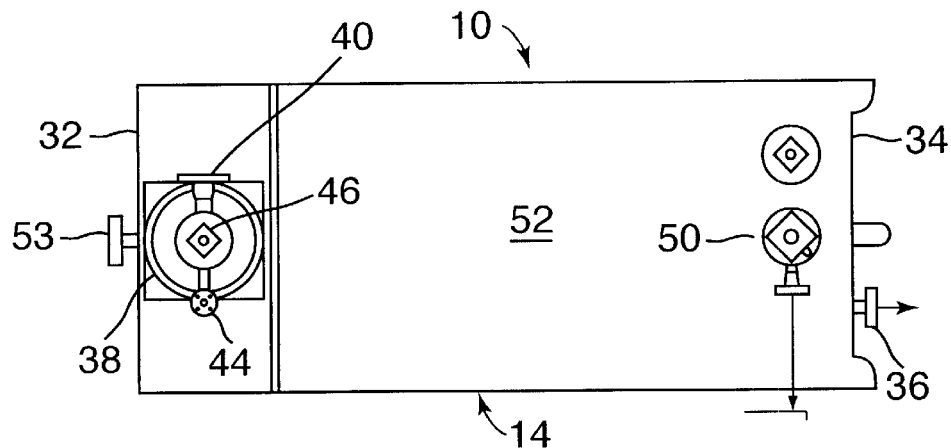
FIG. 1 is a top plan view of an oil-water separator of the type with which the present invention is associated.
Figure 2:
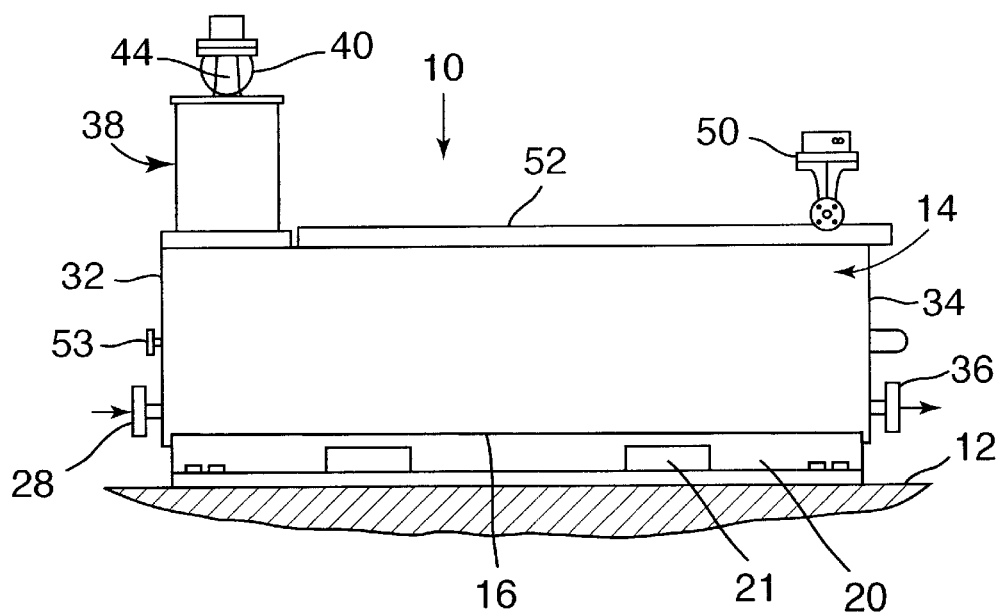
FIG. 2 is side elevation view of the oil-water separator illustrated in FIG. 1.
Figure 3:
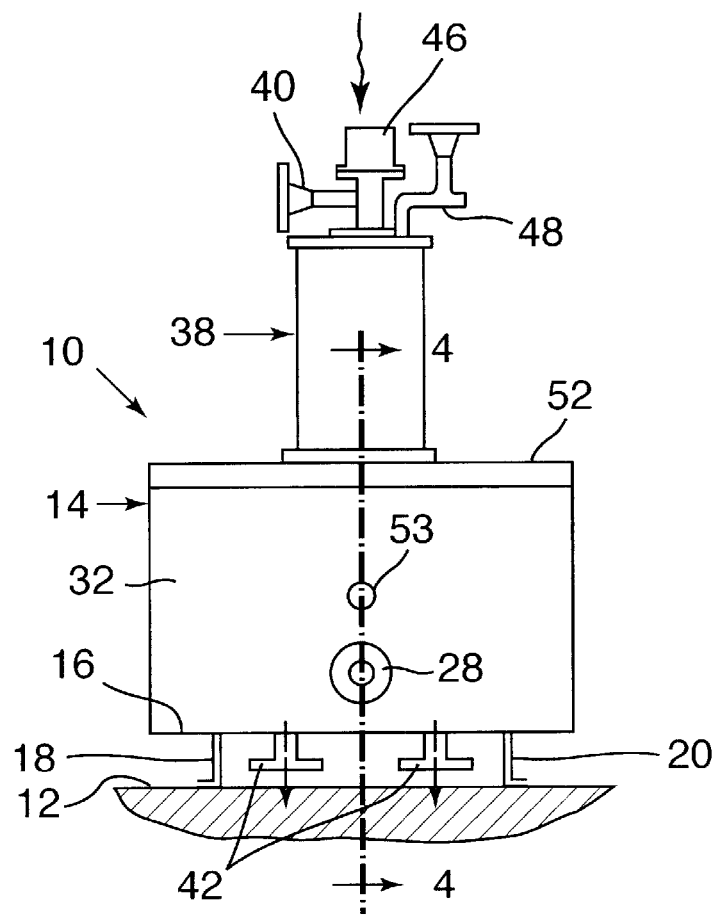
FIG. 3 is an end view of the oil-water separator shown in FIGS. 1 and 2.
Figure 4:
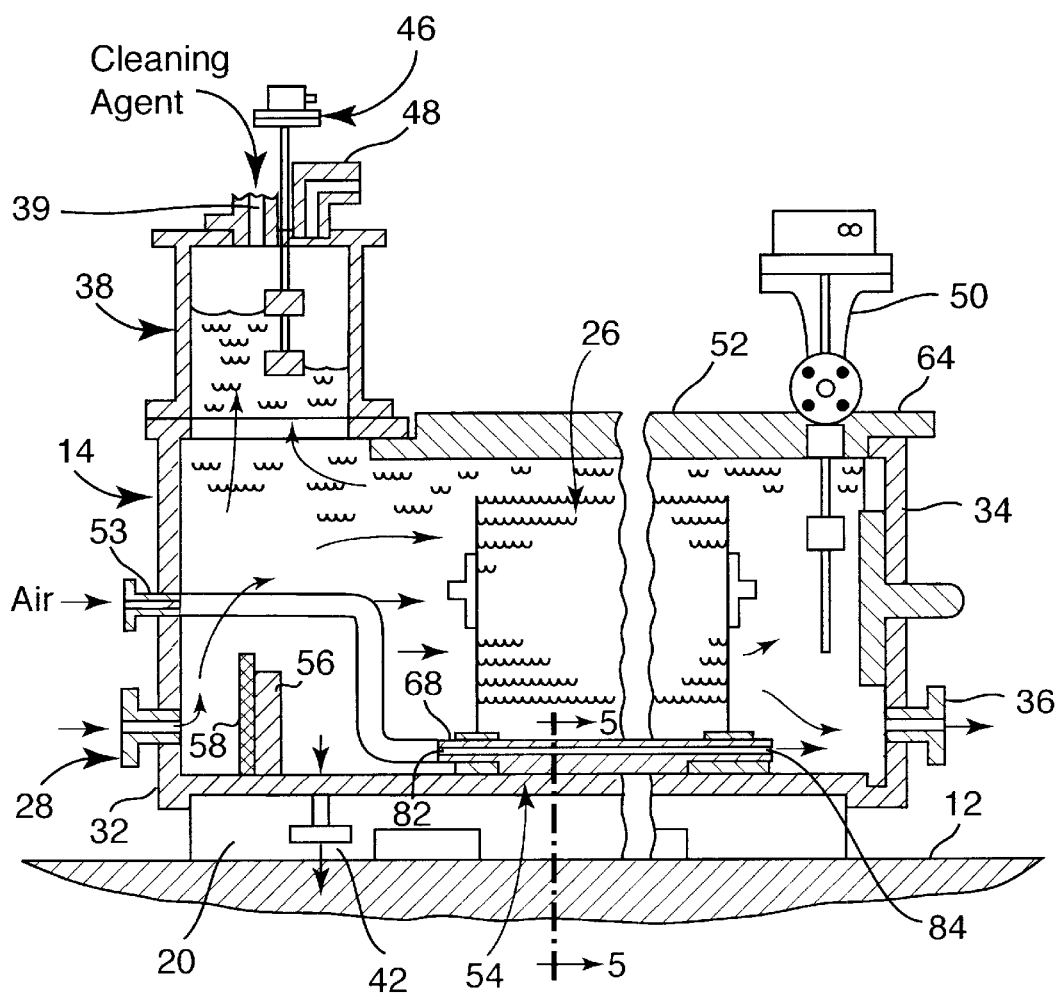
FIG. 4 is a partial section view taken substantially through a plane indicated by section line 4—4 in FIG. 3.
Figure 5:
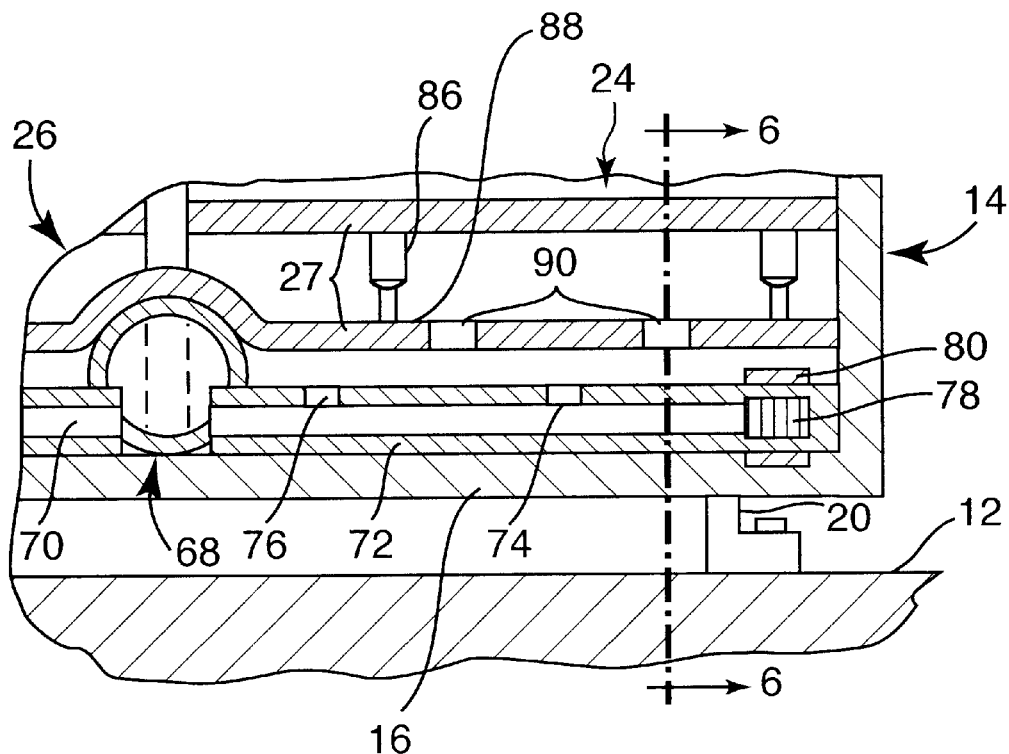
FIG. 5 is an enlarged partial section view taken substantially through a plane indicated by section line 5—5 in FIG. 4.

Referring now to the drawing in detail, FIGS. 1–4 illustrate an oil/water separator, generally referred to by reference numeral 10, supported on and attached at a suitable locations to a surface 12 of a sea-going vessel. The separator 10 includes a tank 14 having a chamber bottom 16 from which a pair of longitudinally extending legs 18 and 20 formed with slots 21 therein project for attachment of the separator 10 to the support surface 12 in spaced relation below the tank chamber bottom 16. The tank 14 receives oily wastewater which undergoes separation treatment within two stacks 24 and 26 as shown in FIG. 5, made of parallel plastic plates 27. The oily wastewater, such as bilgewater enters the lower end portion of the tank chamber through an intake fitting 28 as shown in FIGS. 1 and 4, attached to one longitudinal end 32 of the tank 14. Such incoming bilgewater rises toward the top of the tank 14. The other longitudinal end wall 34 of the tank 14 at its lower end portion has an overboard waste discharge fitting 36. An oil tower 38 is mounted on top of the tank 14 into which separated oil rises and into which a commercially available chemical cleaning agent, such as a bio-emulsifier, is injected through inlet 39 under control of a valve 40 as shown in FIGS. 1–4 for periodic in-situ cleaning of the plates in the stacks 24 and 26 by removal of oil sludge deposited thereon as a result of contact treatment of the incoming bilgewater while undergoing gravitationally induced flow from the top of the tank 14 toward the bottom 16 thereof, from which separated water outflow occurs through drains 42. Also associated with the oil tower 38 is a vent 44 and an oil/water interface sensor 46 to control discharge of separated waste oil through an outlet 48 in order to limit external storage of such waste oil in some external storage tank. A back-up oil level sensor 50 is also mounted on the top 52 of the tank 14 adjacent end 34 to limit the level of separated oil approaching the top 52 of the tank 14 as shown in FIG. 4.

Heretofore, cleaning of the plates 27 in the stacks 24 and 26 was periodically performed by personnel after removal of the stacks 24 and 26 from the tank 14. Such removal and outside cleansing of the plate stacks is avoided, pursuant to the present invention, by its in-situ cleansing with the injected chemical agent enhanced as hereinafter explained.

Enhancement of such in-situ cleansing to a necessary extent involves supply of pressurized air to the tank 14 at its end 32 through an inlet 53 located above the bilgewater inlet 28. Supply of the pressurized air to the inlet 53 occurs from some ship service source for delivery through a conduit to an air sparging array 54 within the tank 14 located on the bottom 16, as shown in FIG. 4 spaced rearwardly from a zinc anode 56 positioned on a weir 58 between the tank end wall 32 and the air sparging array 54.

Figure 7:
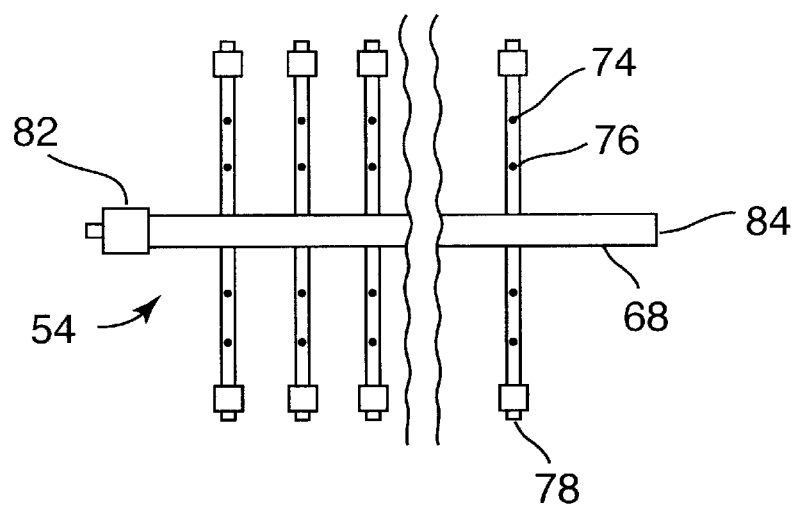
FIG. 7 is a partial top plan view of the air sparging array shown in FIGS. 4 and 6.

With continued reference to FIGS. 4–7, the pressurized air enters a central main header section 68 of the air sparging array 54 for distribution at the tank bottom 16 from a plurality of longitudinally spaced branches of the array 54, respectively formed by pairs of laterally extending side pipe sections 70 and 72. Each pair of aligned side pipe sections 70 and 72 has four laterally spaced port holes formed in the top thereof, including two laterally outer port holes 74 and two laterally inner port holes 76 as shown in FIGS. 5 and 7. Upward bubbled air flow emerges from such port holes 74 and 76 and rises through the plate stacks 24 and 26 to agitate and disperse the chemical cleaning agent in order to enhance separation of the oil concentrate portion of the processed bilgewater which floats toward the top 52 of the tank 14 to a level detected by the sensor 50 positioned between a zinc anode 64 on the tank end wall 34 and the plate stacks 24 and 26 as shown in FIG. 4. With continued reference to FIGS. 5 and 6, the plates 27 of each stack are maintained in vertically spaced relation to each other by pins 86 with their crest formations 88 in alignment with each other.

The two plate stacks 24 and 26 are positioned within the tank 14 so as to extend longitudinally above the air sparger array 54 and in alignment therewith as shown in FIGS. 4 and 5. The plates 27 of each stack 24 and 26, made of a flexible and corrugated plastic, extend longitudinally between the ends 32 and 34 of the tank 14. Each stack 24 and 26 is held in position so as to receive and conduct there through the upward flow of air bubbles from the air sparger array 54 therebelow, through which dispersion of the chemical agent is effected to enhance its cleaning action.

According to one embodiment of the present invention, there are as much as eighteen (18) branches in the air sparger array 54, respectively located in underlying alignment with the crest formations 88 on the overlying corrugated plates 27 of the stacks. Each pair of the branch side pipe sections 70 and 72 is formed with the four (4) top holes 74 and 76 from which the air bubbles emerge. Each side pipe section 70 and 72 is closed at its radially outer end by a plug 78 removably held therein by a coupling 80 as shown in FIG. 5, to enable flush cleaning during service cycles. The main header section 68 is in the form of a seamless tube of larger diameter than the branch pipe sections 70 and 72 soldered thereto so that they all lay flat on the tank bottom 16 between the inlet and outlet ends 82 and 84 of the header section tube 68 through which the pressurized air is conducted. The locations of the branches formed by the laterally extending pipe sections 70 and 72 from the inlet end of the array 54 is such and the size of the top bubble holes 74 and 76 varies between those of smallest diameter in the branch at the inlet end to the largest diameter in the branch at the outlet end, so as to compensate for an excessive reduction in pressure and flow rate of the outflowing bubbled air that would otherwise occur as a function of distance from the inlet end 32 of the tank 14. Where the pressurized air at the inlet end of the air sparger array 54 is at a pressure of 70–90 psi and an entry flow rate of 35 SCFM, the outflow is regulated in accordance with the variation in the diameter size of the port holes 74 and 76 of the air sparger array 54 found suitable as listed below with respect to certain of the eighteen branches in the following table:

| BRANCH NO. | PORT HOLE SIZES IN INCHES |
| --- | --- |
| 1 | 0.046 |
| 4 | 0.049 |
| 8 | 0.051 |
| 10 | 0.053 |
| 12 | 0.056 |
| 14 | 0.058 |
| 16 | 0.060 |
| 18 | 0.063 |

Figure 6:
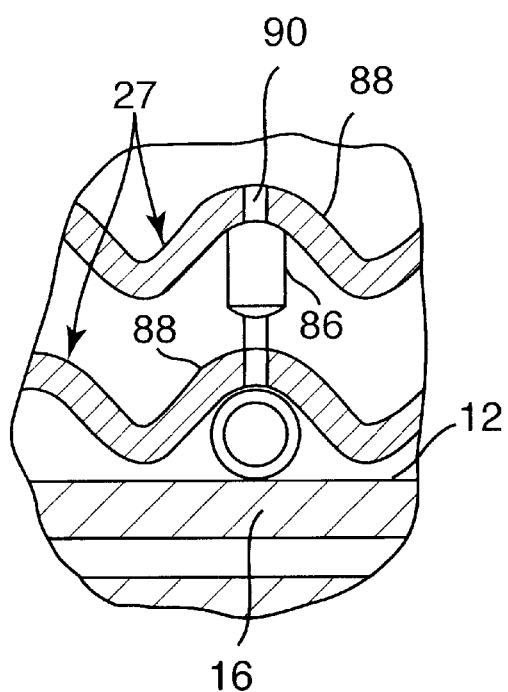
FIG. 6 is a partial section view taken substantially through a plane indicated by section line 6—6 in FIG. 5.

Furthermore, as shown in FIGS. 5 and 6, spaced holes 90 formed within the stack plates 27 along their crest formations 88 are located so as not to be aligned with the port holes 74 and 76 therebelow in the array branch pipe sections 70 and 72. Upward air flow is accordingly diverted along paths having a greater disbursing effect on the cleansing agent during passage through the stacks. Thus, the air pressure, flow rate and flow paths of the air emerging from the top port holes 74 and 76 of the air sparger array 54, correspondingly varies to achieve distribution producing beneficial results.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an oil and water separator tank within which oily wastewater undergoes separation treatment, by a separator having an air sparger and plates for performance of the treatment; means for enhanced in-situ cleansing of the plates contaminated by exposure to the oily wastewater in the tank during said separation treatment, comprising: a main flow header; means for positioning the air sparger with a plurality of flow distributing branches connected thereto on the main flow header, air emergence means thereon for outflow of pressurized air therefrom within the separator tank at plural locations therein below the plates and means for injecting a chemical cleaning agent into said tank for cleaning said plates.

2. The combination as defined in claim 1, wherein each of the air emergence means respectively associated with the flow distributing branches has plural bubble ports laterally spaced from the main flow header.

3. The combination as defined in claim 2, wherein the bubble ports respectively associated with the flow distributing branches vary in size between a minimum and a maximum, and are in non-aligned relation to holes in the plates thereabove through which flow paths of the air undergoing said outflow are established to disburse a cleaning agent.

4. The combination as defined in claim 3, wherein said plurality of the branches number eighteen and the plural bubble ports associated with each of the branches number four.

5. The combination as defined in claim 1, wherein said plurality of the branches number eighteen and the plural locations of said outflow associated with each of the branches number four.

6. The combination as defined in claim 2, wherein said plurality of the branches number eighteen and the plural bubble emerging ports associated with each of the branches number four.

7. In combination with a one zone chamber within which cleansing treatment of rising oily wastewater is performed by exposure to a chemical cleaning agent on plates subject to in-situ cleaning after contamination during said cleansing treatment of the wastewater; said chamber having inlet means connected thereto for introducing pressurized air therein; air sparging means connected to the inlet means within the chamber for distribution of the pressurized air therein; and means for enhancing said in-situ cleaning of the plates by positioning the air sparging means below all of the plates to direct said distribution of the pressurized air said means for enhancing said in-situ cleaning further includes means for injecting said chemical cleaning agent into said tank.

8. The combination as defined in claim 7, wherein said air sparging means comprises: an array of spaced branches respectively provided with air bubble emerging port holes at said plural locations.

9. The combination as defined in claim 8, wherein said plates have aligned crest formations within which spaced holes are formed in non-aligned relation to the air bubble emerging port holes to establish unrestricted diverted flow paths between the plates for said distribution flow of the pressurized air.

* * * * *